United States Patent
Ozaki et al.

(10) Patent No.: US 11,070,737 B2
(45) Date of Patent: Jul. 20, 2021

(54) EXPOSURE CONTROL DEVICE AND EXPOSURE CONTROL METHOD

(71) Applicants: DENSO CORPORATION, Kariya (JP); TOYOTA JIDOSHA KABUSHIKI KAISHA, Toyota (JP)

(72) Inventors: Kyohei Ozaki, Kariya (JP); Taichi Hasegawa, Kariya (JP); Kunihiro Sugihara, Toyota (JP); Goro Asai, Toyota (JP); Tomoaki Iida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/026,682

(22) Filed: Sep. 21, 2020

(65) Prior Publication Data
US 2021/0006703 A1 Jan. 7, 2021

Related U.S. Application Data

(63) Continuation of application No. PCT/JP2019/007402, filed on Feb. 26, 2019.

(30) Foreign Application Priority Data

Mar. 23, 2018 (JP) ................................. 2018-056444

(51) Int. Cl.
*G03B 7/28* (2021.01)
*H04N 5/235* (2006.01)
*H04N 7/18* (2006.01)

(52) U.S. Cl.
CPC ............. *H04N 5/2353* (2013.01); *G03B 7/28* (2013.01); *B60R 2300/105* (2013.01)

(58) Field of Classification Search
USPC ......................................................... 348/148
See application file for complete search history.

(56) References Cited

U.S. PATENT DOCUMENTS

| 2004/0165091 A1* | 8/2004 | Takemura | ............ | H04N 5/2355 |
| | | | | 348/296 |
| 2010/0194289 A1 | 8/2010 | Katayanagi et al. | | |
| 2010/0279661 A1* | 11/2010 | Furuta | ..................... | H04M 1/57 |
| | | | | 455/412.2 |

FOREIGN PATENT DOCUMENTS

| JP | S63-124687 A | 5/1988 |
| JP | 2000-208281 A | 7/2000 |

(Continued)

*Primary Examiner* — Patricia I Young
(74) *Attorney, Agent, or Firm* — Maschoff Brennan (57) ABSTRACT

An exposure control device of a vehicle-mounted camera comprises an illuminance level determination unit, a plurality of timers, a timer operating unit, and an exposure level determination unit. The illuminance level determination unit determines that an illumination level of an external light illuminance corresponds to one of a plurality of illuminance levels. The timers each provided for a corresponding one of a plurality of change modes, the change modes being defined among the plurality of illuminance levels, or among a plurality of exposure levels for an exposure of a vehicular camera. The timer operating unit operates each of the timers in accordance with a state of change of the illuminance level of the external light illuminance. The exposure level determination unit determines one of the exposure levels for the exposure of the vehicular camera based on a count state of each of the timers.

20 Claims, 3 Drawing Sheets

(56) References Cited

FOREIGN PATENT DOCUMENTS

| JP | 2005-167842 A | 6/2005 |
|---|---|---|
| JP | 2007-168570 A | 7/2007 |

\* cited by examiner

EXPOSURE CONTROL DEVICE AND EXPOSURE CONTROL METHOD

CROSS-REFERENCE TO RELATED APPLICATION

The present application is a continuation application of International Application No. PCT/JP2019/007402, filed on Feb. 26, 2019, which claims priority to Japanese Patent Application No. 2018-56444 filed on Mar. 23, 2018. The contents of these applications are incorporated herein by reference in their entirety.

BACKGROUND

Technical Field

The present disclosure relates to an exposure control device and an exposure control method for a vehicle-mounted camera.

Background Art

One known device of this kind detects the external light illuminance, that is, the illuminance around the vehicle and controls the exposure according to the detected results.

SUMMARY

In the present disclosure, provided is an exposure control device of a vehicle-mounted camera as the following.

The exposure control device of a vehicle-mounted camera includes:

an illumination level determination unit configured to determine that an illumination level of an external light illuminance corresponds to one of a plurality of illuminance levels;

a plurality of timers each provided for a corresponding one of a plurality of change modes, the change modes being defined among the plurality of illuminance levels, or among a plurality of exposure levels for an exposure of a vehicular camera;

a timer operating unit configured to operate each of the timers in accordance with a state of change of the illuminance level of the external light illuminance; and an exposure level determination unit configured to determine one of the exposure levels for the exposure of the vehicular camera based on a count state of each of the timers.

DETAILED DESCRIPTION OF THE PREFERRED EMBODIMENTS

[PTL 1] JP 2005-167842 A

In the PTL 1, for example, when a vehicle enters a tunnel or travels under an overpass, the external light illuminance changes by a large amount in a short time. In such a case, a conventional device of this type may suffer hunting in the exposure control of the vehicle-mounted camera.

Further, a vehicle-mounted camera can be used not only for automated driving control as described in PTL 1 or the like, but also for an in-vehicle monitor, for example. Such an on-vehicle monitor device may be a so-called electronic mirror device or the like, and it is a device configured to display images of the outside of the vehicle on a display provided in the vehicle compartment. When hunting occurs in the exposure control of the on-vehicle monitor device, the display screen may flicker, which may be unpleasant for an occupant.

The present disclosure has been devised in view of the above-exemplified circumstances and the like. That is, the present disclosure provides, for example, a configuration and a control method of an exposure control device that optimize the exposure control of a vehicle-mounted camera.

According to one aspect of the present disclosure, an exposure control device of a vehicle-mounted camera includes:

an illumination level determination unit configured to determine that an illumination level of an external light illuminance corresponds to one of a plurality of illuminance levels;

a plurality of timers each provided for a corresponding one of a plurality of change modes, the change modes being defined among the plurality of illuminance levels, or among a plurality of exposure levels for an exposure of a vehicular camera;

a timer operating unit configured to operate each of the timers in accordance with a state of change of the illuminance level of the external light illuminance; and an exposure level determination unit configured to determine one of the exposure levels for the exposure of the vehicular camera based on a count state of each of the timers.

According to another aspect of the present disclosure, an exposure control method of a vehicle-mounted camera includes the steps of:

determining that an illumination level of an external light illuminance corresponds to one of a plurality of illuminance levels;

operating each of a plurality of timers, each provided for a corresponding one of a plurality of change modes, the change modes being defined among the plurality of illuminance levels, or among a plurality of exposure levels for an exposure of a vehicular camera; and determining one of the exposure levels for the exposure of the vehicular camera based on a count state of each of the timers.

In such a configuration, the illuminance level determination unit determines which of the illuminance levels corresponds to the external light illuminance. The timers each correspond to one of a plurality of change modes between the plurality of illuminance levels, or between the plurality of exposure levels of the vehicle-mounted camera. That is, one of the timers corresponds to one of change modes between the illuminance levels or between the exposure levels. On the other hand, another timer corresponds to another change mode between the illuminance levels or between the exposure levels.

The timer operating unit operates each of the timers in accordance with the state of change of the illuminance level. The exposure level determination unit determines the exposure level of the vehicle-mounted camera based on the count state of each of the timers.

According to such a configuration, the timers, each corresponding to one of the change modes between the illuminance levels or between the exposure levels, are operated in accordance with the state of change of the illuminance level. The exposure level of the vehicle-mounted camera is determined based on the count state of each of the timers. As a result, an appropriate temporal hysteresis can be provided between a change in the illuminance level and a change in the exposure level of the vehicle-mounted camera. Therefore, according to such a configuration, it is possible to further optimize the exposure control of the vehicle-mounted camera.

The reference signs in parentheses attached after the elements each indicates an example of the correspondence between the element and specific means described in connection with an embodiment described later. Therefore, the present disclosure is not limited by the above reference signs.

Embodiments

An embodiment will be described below with reference to the drawings. Note that various modifications applicable to one embodiment will be described all together after the explanation, as it may interfere with the understanding of the embodiment if they are inserted in the middle of the description of the embodiment.
(Overall Configuration)

Figure 1:
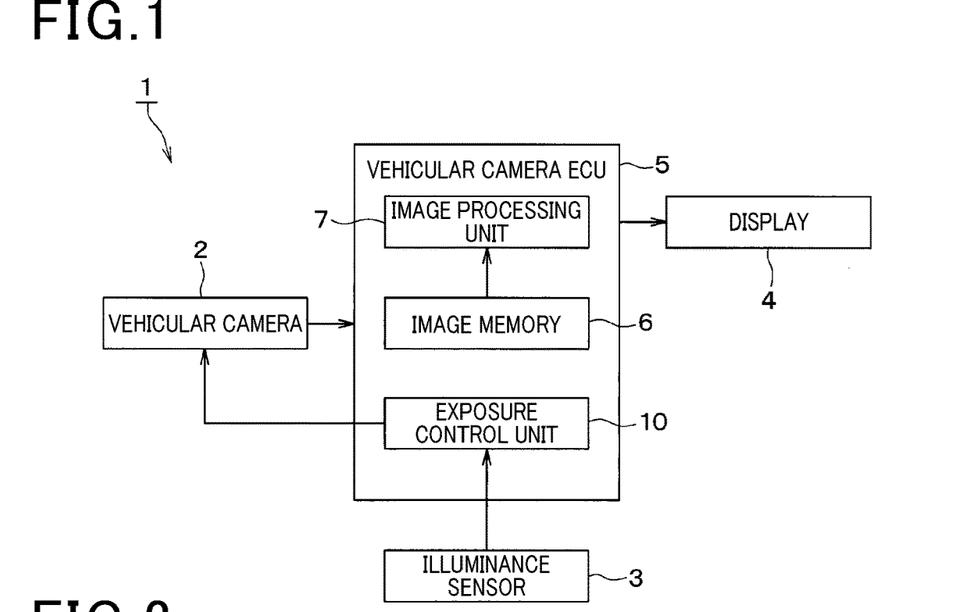
FIG. 1 is a block diagram showing the schematic configuration of an on-vehicle monitor device.

First, the schematic configuration of an on-vehicle monitor device 1, which is a specific example of an application target of the exposure control device according to the present disclosure, will be described with reference to FIG. 1. The vehicle equipped with the on-vehicle monitor device 1 is hereinafter referred to as a "own vehicle".

In the present embodiment, the on-vehicle monitor device 1 is a so-called electronic mirror device, and is configured to display, in the vehicle compartment of the own vehicle, an image of the surroundings of the own vehicle captured by a vehicle-mounted camera 2. Specifically, the on-vehicle monitor device 1 includes the vehicle-mounted camera 2, an illuminance sensor 3, a display 4, and a vehicle-mounted camera ECU 5. ECU is an abbreviation for Electronic Control Unit.

The vehicle-mounted camera 2 is provided with an image sensor such as a CCD sensor or a CMOS sensor, and is placed so as to capture images of the surroundings of the own vehicle. CCD is an abbreviation for Charge Coupled Device. CMOS is an abbreviation for Complementary Metal Oxide Semiconductor.

The illuminance sensor 3 is provided so as to generate, as an output signal, an electric output (for example, a voltage) corresponding to the external light illuminance, that is, the illuminance around the own vehicle. The display 4 includes an image display device such as a liquid crystal display or an organic EL display, and is placed inside the vehicle compartment of the own vehicle. EL is an abbreviation for electro-luminescence.

The vehicle-mounted camera 2, the illuminance sensor 3, and the display 4 are communicatively connected to the vehicle-mounted camera ECU 5. The vehicle-mounted camera ECU 5 is a vehicle-mounted microcomputer that controls the overall operation of the on-vehicle monitor device 1, and it includes a CPU, a ROM, a RAM, and a non-volatile RAM (not shown in the drawing). The non-volatile RAM is, for example, a flash ROM or the like. The CPU, ROM, RAM and non-volatile RAM of the vehicle-mounted camera ECU 5 will be simply referred to as "CPU", "ROM", "RAM", and "non-volatile RAM" hereinafter.

That is, the vehicle-mounted camera ECU 5 is configured such that various control operations can be realized by the CPU reading and executing programs from the ROM or the non-volatile RAM. Further, various data used when the programs are executed are stored in advance in the ROM or the non-volatile RAM. The various data include, for example, initial values, lookup tables, maps, and the like. The RAM is provided so as to temporarily store calculation results, data input from the outside, and the like when the CPU executes programs.

The vehicle-mounted camera ECU 5 includes an image memory 6, an image processing unit 7, and an exposure control unit 10 as a functional configuration realized on the vehicle-mounted microcomputer. The image memory 6 is provided so as to acquire image data corresponding to images captured by the vehicle-mounted camera 2 and temporarily store it. The image processing unit 7 is provided so as to perform appropriate image processing on the image data temporarily stored in the image memory 6 and output the processed image data to the display 4.
(Functional Configuration of Exposure Control Unit)

The exposure control unit 10, which is an embodiment of the exposure control device according to the present disclosure, is configured to control the exposure of the vehicle-mounted camera 2 based on the output signal acquired from the illuminance sensor 3. Specifically, referring to FIG. 2, the exposure control unit 10 includes an illuminance level determination unit 11, a timer operating unit 12, a timer 13, a timer determination unit 14, and an exposure level determination unit 15 as a functional configuration realized on an in-vehicle microcomputer.

Figure 2:
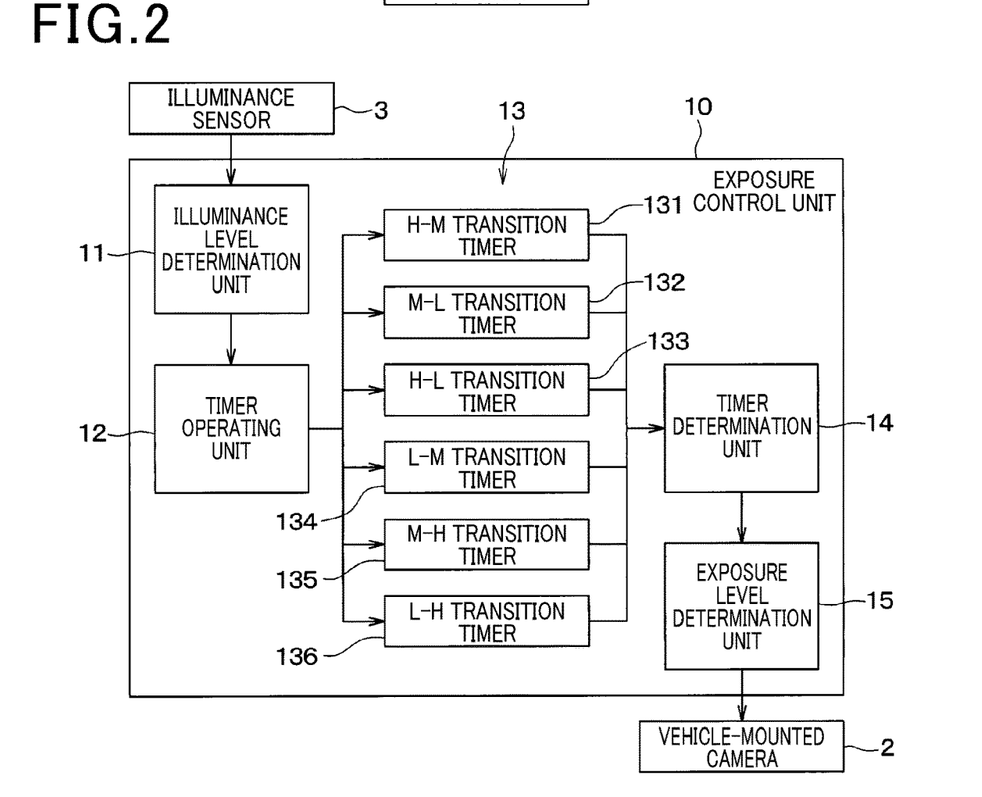
FIG. 2 is a block diagram showing the functional configuration of the exposure control unit shown in FIG. 1.

The illuminance level determination unit 11 is provided to determine which of a plurality of illuminance levels does the external light illuminance correspond to. Specifically, in the present embodiment, the illuminance level determination unit 11 is configured to determine the external light illuminance in three levels of H level, M level, and L level. The "H level" is a high illuminance level corresponding to daytime, and corresponds to, for example, about 350 lux or higher. The "L level" is a low illuminance level corresponding to nighttime, and corresponds to, for example, lower than about 100 lux. The "M level" is a level between the H level and the L level. That is, the M level is a medium illuminance level corresponding to evening and dawn, and corresponds to, for example, about 100 to about 350 lux. Note that, as will be apparent from the description on the modifications below, these numerical values are merely examples for the sake of convenience in order to help understanding of the present embodiment. Therefore, it goes without saying that the present disclosure is not limited to these numerical values.

Further, in the present embodiment, the illuminance level determination unit 11 has a determination threshold that causes quantitative hysteresis in the determination of the illuminance level. That is, the illuminance level determination unit 11 is configured such that the determination threshold used to determine that the illuminance level has changed from the low illuminance level to the high illuminance level is higher than the determination threshold used to determine that the illuminance level has changed from the high illuminance level to the low illuminance level.

Figure 3:
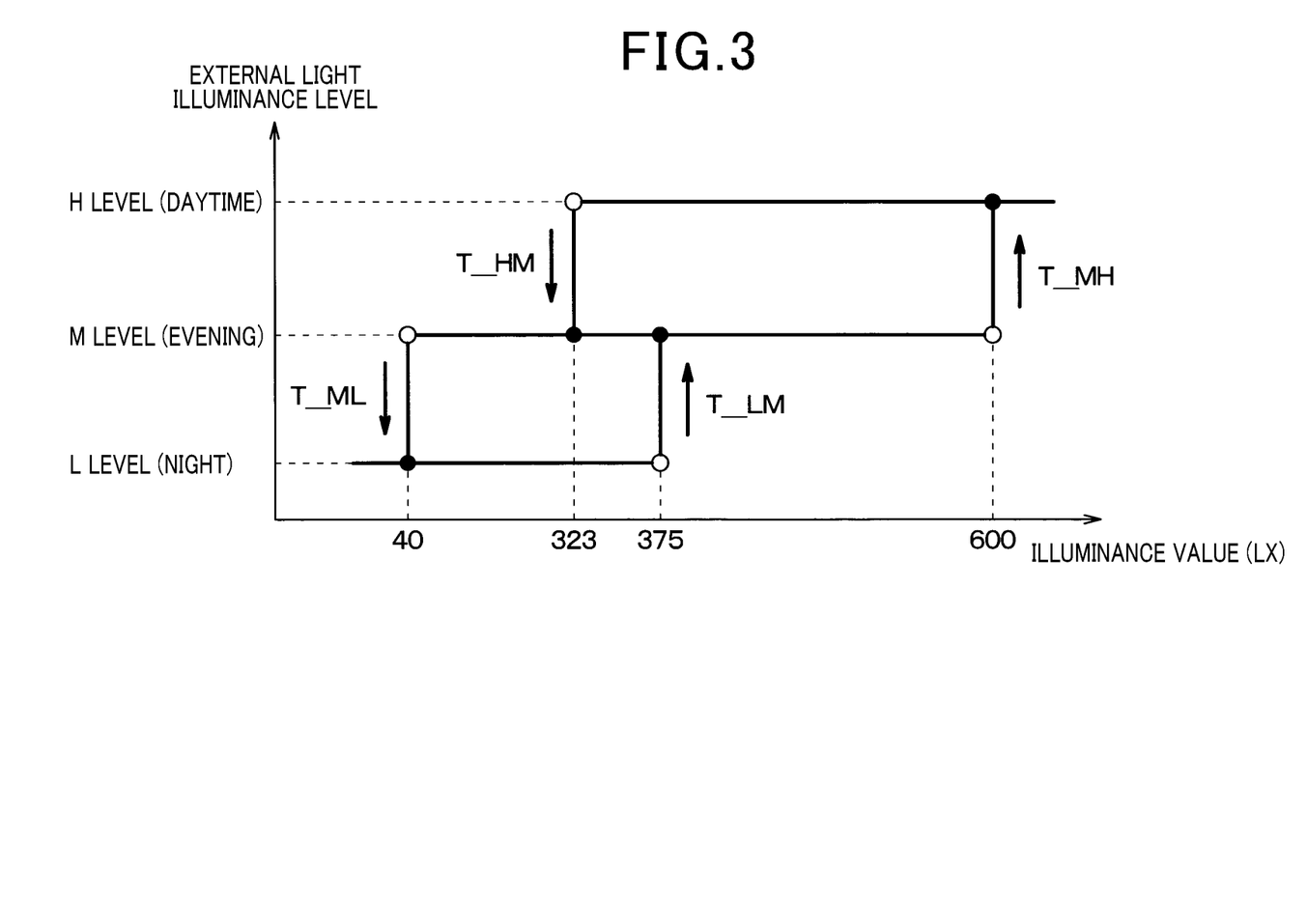
FIG. 3 is a graph showing an overview of the operation of the exposure control unit shown in FIG. 2.

Specifically, in the present embodiment, as shown in FIG. 3, the determination threshold T_MH used to determine that the illuminance level has changed from the M level to the H level is set to the higher illuminance side than the determination threshold T_HM used to determine that the illuminance level has changed from the H level to the M level. Similarly, the determination threshold T_LM used to determine that the illuminance level has changed from the L level to the M level is set to the higher illuminance side than the determination threshold T_ML used to determine that the illuminance level has changed from the M level to the L level. Furthermore, the relationship between the determination thresholds is set to be T_MH>T_LM>T_HM>T_ML. Note that FIG. 3 shows a specific example for presenting references of the illuminance values corresponding to the determination thresholds.

The timer operating unit 12 is provided to operate each of the timers 13 in accordance with the state of change of the illuminance level determined by the illuminance level determination unit 11. That is, the timer operating unit 12 is configured to start, continue, stop, or reset the count-up of each of the plurality of timers 13 according to the state of change of the illuminance level.

Each timer 13 is provided for the corresponding one of a plurality of change modes between a plurality of illuminance levels, or between a plurality of exposure levels of the vehicle-mounted camera 2. That is, respective timers 13 are associated with different illuminance level changes or exposure level changes.

Specifically, in the present embodiment, three exposure levels are set: a low exposure level used when the illuminance level is the H level, a medium exposure level used when the illuminance level is the M level, and a high exposure level used when the illuminance level is the L level. Further, an H-M transition timer 131, an M-L transition timer 132, an H-L transition timer 133, an L-M transition timer 134, an M-H transition timer 135, and an L-H transition timer 136 are provided as the plurality of timers 13.

The H-M transition timer 131 is provided corresponding to the mode where the exposure level changes from the low exposure level to the medium exposure level in response to the illuminance level changing from the H level to the M level. The M-L transition timer 132 is provided corresponding to the mode where the exposure level changes from the medium exposure level to the high exposure level in response to the illuminance level changing from the M level to the L level. The H-L transition timer 133 is provided corresponding to the mode where the exposure level changes from the low exposure level to the high exposure level in response to the illuminance level changing from the H level to the L level.

The H-M transition timer 131 corresponds to the "first timer". The M-L transition timer 132 corresponds to the "fourth timer". The H-L transition timer 133 corresponds to the "third timer". These timers correspond to cases where the illuminance around the own vehicle decreases, that is, the illuminance changes in the direction of darkening.

The L-M transition timer 134 is provided corresponding to the mode where the exposure level changes from the high exposure level to the medium exposure level in response to the illuminance level changing from the L level to the M level. The M-H transition timer 135 is provided corresponding to the mode where the exposure level changes from the medium exposure level to the low exposure level in response to the illuminance level changing from the M level to the H level. The L-H transition timer 136 is provided corresponding to the mode where the exposure level changes from the high exposure level to the low exposure level in response to the illuminance level changing from the L level to the H level.

The L-M transition timer 134 corresponds to the "fifth timer". The M-H transition timer 135 corresponds to the "second timer". The L-H transition timer 136 corresponds to the "sixth timer". These timers correspond to cases where the illuminance around the own vehicle increases, that is, the illuminance changes in the direction of brightening.

The timer determination unit 14 is provided to determine the count state of each of the plurality of timers 13. That is, the timer determination unit 14 is configured to determine whether each timer 13 has been counted up. "count up" means that the count value of each timer 13 has reached a predetermined value. The "count value" may also be referred to as "count time". The count up condition for each of the plurality of timers 13 may be common or may be set individually.

The exposure level determination unit 15 is provided to determine the exposure level of the vehicle-mounted camera 2 based on the determination result of the timer determination unit 14. That is, in the present embodiment, the exposure control unit 10 is configured to change the exposure of the vehicle-mounted camera 2 stepwise rather than continuously.

(Outline of Operation)

Next, the outline of the operation according to the configuration of the present embodiment will be described together with the actions and effects provided by the configuration. The illuminance sensor 3 generates an electric output corresponding to the external light illuminance around the own vehicle. The electric output of the illuminance sensor 3 is input to the illuminance level determination unit 11 in the exposure control unit 10. The illuminance level determination unit 11 determines which of a plurality of illuminance levels, that is, the H level, the M level, and the L level does the external light illuminance correspond to.

In the determination performed by the illuminance level determination unit 11, as shown in FIG. 3, a relationship of T_MH>T_LM>T_HM>T_ML is set between the determination thresholds T_HM, T_MH, T_ML, and T_LM. The determination threshold T_HM is a determination threshold for determining that the external light illuminance has changed from the H level to the M level. The determination threshold T_MH is a determination threshold for determining that the external light illuminance has changed from the M level to the H level. The determination threshold T_ML is a determination threshold for determining that the external light illuminance has changed from the M level to the L level. The determination threshold T_LM is a determination threshold for determining that the external light illuminance has changed from the L level to the M level.

By setting the determination thresholds as described above, quantitative hysteresis occurs in the determination of the illuminance level. The exposure control unit 10 controls the exposure level of the vehicle-mounted camera 2 in three tiers: a low exposure level, a medium exposure level, and a high exposure level, based on the illuminance level thus determined. This makes it possible to reduce the hunting in the exposure control of the vehicle-mounted camera 2 to a predetermined extent.

Figure 4:
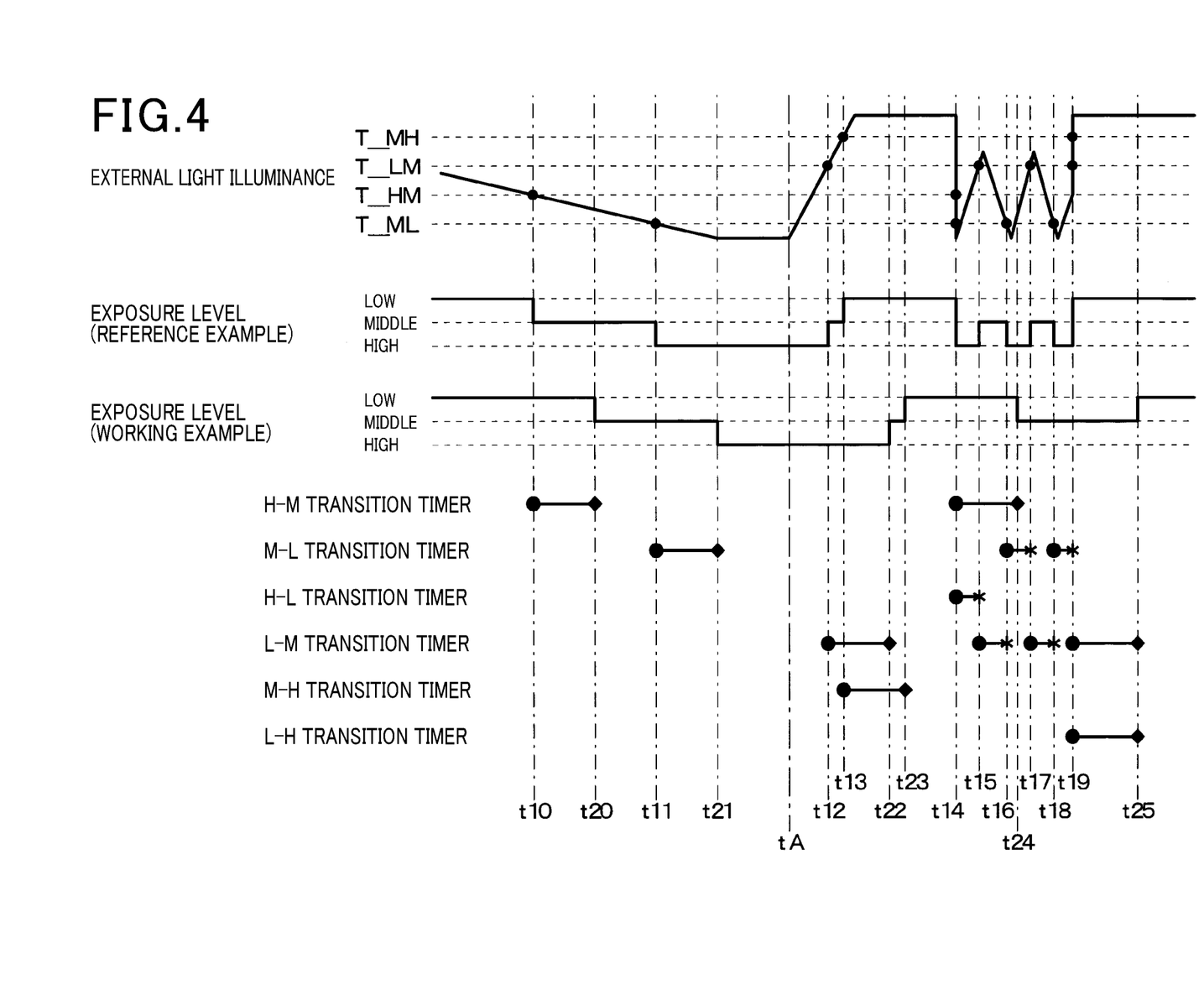
FIG. 4 is a time chart showing an example of the operation of the exposure control unit shown in FIG. 2.

However, for example, when the own vehicle enters a tunnel or travels under an overpass, the external light illuminance changes by a large amount in a short time. The time chart of FIG. 4 shows a specific example of such a case. In the figure, t10 to t25 and tA indicate time.

That is, in the specific example of FIG. 4, the external light illuminance gradually decreases from time t10 to time t21. From time t21 to time tA, the external light illuminance is substantially constant. The external light illuminance sharply increases from time tA, and then changes from time t14 to time t19 by a large amount in a short time. It is assumed that the own vehicle is traveling in a tunnel from time t14 to time t19.

The uppermost-stage time chart entitled "external light illuminance" among the time charts of FIG. 4 shows changes in the external light illuminance together with the determination thresholds. The second-stage time chart entitled "exposure level (reference example)" shows a reference example, that is, the state of exposure control in a case where the quantitative hysteresis shown in FIG. 3 is directly used for exposure control. The third-stage time chart entitled "exposure level (embodiment)" shows the state of exposure control according to the present embodiment. The lowest-stage time chart shows the count state of each timer 13.

As shown in the second-stage time chart of FIG. 4, in the reference example, the exposure level is changed from the low exposure level to the medium exposure level at time t10 when the external light illuminance becomes lower than the determination threshold T_HM. Similarly, after that, the exposure level is changed from the medium exposure level to the high exposure level at time t11 when the external light illuminance is decreasing and becomes lower than the determination threshold T_ML.

In this specific example, after time t11, the external light illuminance sharply increases from time tA. Then, the exposure level is changed from the high exposure level to the medium exposure level at time t12 when the external light illuminance is increasing and exceeds the determination threshold T_LM. Further, when the external light illuminance exceeds the determination threshold T_MH at time t13 immediately after time t12, the exposure level is changed from the medium exposure level to the low exposure level.

The external light illuminance is substantially constant at the H level for a while from immediately after time t13 to time t14. After that, when the own vehicle enters a tunnel at time t14, in the tunnel, the own vehicle alternately passes through dark sections between adjacent lights and bright sections directly below the lights.

Correspondingly, first, at time t14, the external light illuminance sharply drops and falls below both the determination threshold T_HM and the determination threshold T_ML. Then, at time t14, the exposure level is directly changed from the low level to the high level. On the other hand, from time t14, the external light illuminance starts to increase sharply, and the external light illuminance exceeds the determination threshold T_LM at time t15 immediately after time t14. Then, at time t15, the exposure level is changed from the high exposure level to the medium exposure level.

Immediately after time t15, the external light illuminance sharply decreases again and becomes lower than the determination threshold T_ML at time t16. Then, at time t16, the exposure level is changed from the medium exposure level to the high exposure level. Immediately after that, the external light illuminance starts to increase again and increases rapidly, and it exceeds the determination threshold T_LM at time t17. Then, at time t17, the exposure level is changed from the high exposure level to the medium exposure level.

Likewise, immediately after time t17, the external light illuminance sharply decreases again and becomes lower than the determination threshold T_ML at time t18. Then, at time t18, the exposure level is changed from the medium exposure level to the high exposure level. After that, the own vehicle exits the tunnel and the external light illuminance starts to increase sharply, and exceeds both the determination threshold T_LM and the determination threshold T_MH at time t19. Then, at time t19, the exposure level is changed directly from the high exposure level to the low exposure level.

As described above, in the reference example, the exposure level of the vehicle-mounted camera 2 fluctuates in a short time between time t14 and time t19. As a result, flickering may appear on the display screen of the display 4, which may be unpleasant for an occupant.

In this regard, in the configuration of the present embodiment, each timer 13 is provided for the corresponding one of a plurality of change modes between a plurality of illuminance levels, or between a plurality of exposure levels. That is, one of the timers 13 corresponds to one change mode between illuminance levels or between exposure levels. On the other hand, another timer 13 corresponds to another change mode between illuminance levels or between exposure levels.

Specifically, the H-M transition timer 131 corresponds to the mode where the exposure level changes from the low exposure level to the medium exposure level in response to the external light illuminance changing from the H level to the M level. The M-L transition timer 132 corresponds to the mode where the exposure level changes from the medium exposure level to the high exposure level in response to the external light illuminance changing from the M level to the L level. The H-L transition timer 133 corresponds to the mode where the exposure level changes from the low exposure level to the high exposure level in response to the external light illuminance changing from the H level to the L level.

Further, the L-M transition timer 134 corresponds to the mode where the exposure level changes from the high exposure level to the medium exposure level in response to the external light illuminance changing from the L level to the M level. The M-H transition timer 135 corresponds to the mode where the exposure level changes from the medium exposure level to the low exposure level in response to the external light illuminance changing from the M level to the H level. The L-H transition timer 136 corresponds to the mode where the exposure level changes from the high exposure level to the low exposure level in response to the external light illuminance changing from the L level to the H level.

The timer operating unit 12 operates each of the timers 13 according to the state of change of the illuminance level. First, modes where the external light illuminance decreases will be described.

Specifically, when the illuminance level changes from the H level to the M level, the timer operating unit 12 counts up the H-M transition timer 131. Further, in this case, the timer operating unit 12 resets the M-H transition timer 135 and the L-H transition timer 136 in response to the illuminance level no longer being the H level. The M-H transition timer 135 and the L-H transition timer 136 that have been reset here correspond to the illuminance level rising and changing from another level to the H level.

When the illuminance level changes from the M level to the L level, the timer operating unit 12 counts up the M-L transition timer 132. In this case, the timer operating unit 12 resets the L-M transition timer 134 which corresponds to a mode opposite to that of the M-L transition timer 132 which has been counted up.

When the illuminance level changes from the H level to the L level following a sharp decrease in the external light illuminance, the timer operating unit 12 counts up the H-L transition timer 133. Further, in this case, the timer operating unit 12 resets the L-M transition timer 134, the M-H transition timer 135, and the L-H transition timer 136 which correspond to the increasing of the external light illuminance.

In addition, in this case, the timer operating unit 12 also counts up the H-M transition timer 131. The reason for counting up not only the H-L transition timer 133 but also the H-M transition timer 131 in this case is as follows. That is, the external light illuminance may increase from the L level to the M level before the H-L transition timer 133 is counted up. This is because, in such a case, counting up the H-M transition timer 131 makes it possible to quickly change to the medium exposure level corresponding to the M level.

Next, modes where the external light illuminance increases will be described. When the illuminance level changes from the L level to the M level, the timer operating unit 12 counts up the L-M transition timer 134. Further, in this case, the timer operating unit 12 resets the M-L transition timer 132 and the H-L transition timer 133 in response to the illuminance level no longer being L level. The M-L timer 132 and the H-L transition timer 133 that have been reset here correspond to the illuminance level decreasing and changing from another level to the L level.

When the illuminance level changes from the M level to the H level, the timer operating unit 12 counts up the M-H transition timer 135. In this case, the timer operating unit 12 resets the H-M transition timer 131 which corresponds to a mode opposite to the M-H transition timer 135 which has been counted up.

When the illuminance level changes from the L to level to the H level following a sharp increase in the external light illuminance, the timer operating unit 12 counts up the L-H transition timer 136. Further, in this case, the timer operating unit 12 resets the H-M transition timer 131, the M-L transition timer 132, and the H-L transition timer 133 which correspond to decreasing of the external light illuminance.

In addition, in this case, the timer operating unit 12 also counts up the L-M transition timer 134. The reason for counting up not only the L-H transition timer 136 but also the L-M transition timer 134 in this case is as follows. That is, the external light illuminance may increase from the H level to the M level before the L-H transition timer 136 is counted up. This is because, in such a case, counting up the L-M transition timer 134 makes it possible to quickly change to the medium exposure level corresponding to the M level.

The operations of the timer operating unit 12 as described above are summarized in Table 1 below. In Table 1, "UP" indicates execution of count-up. Execution of count-up is the start or continuation of count-up. "C" indicates reset, that is, clearing of the count value. The blank cells indicate that count-up is not executed, that is, count-up is not started or continued.

TABLE 1

|  |  | Timer | | | | | |
|---|---|---|---|---|---|---|---|
|  |  | H-M | M-L | H-L | L-M | M-H | L-H |
| Illuminance level change | H→M | UP |  |  |  | C | C |
|  | M→L |  | UP |  | C |  |  |
|  | H→L | UP |  | UP | C | C | C |
|  | L→M |  | C |  | UP |  |  |
|  | M→H | C |  |  |  | UP |  |
|  | L→H | C | C | C | UP |  | UP |

The timer determination unit 14 determines the count state of each timer 13. Specifically, the timer determination unit 14 determines whether any of the H-M transition timer 131, M-L transition timer 132, H-L transition timer 133, L-M transition timer 134, M-H transition timer 135, and L-H transition timer 136 has been counted up.

The exposure level determination unit 15 determines the exposure level of the vehicle-mounted camera 2 based on the count state of each timer 13. Specifically, when the H-M transition timer 131 has been counted up, the exposure level determination unit 15 changes the exposure level to the medium exposure level. When the M-L transition timer 132 has been counted up, the exposure level determination unit 15 changes the exposure level to the high exposure level. When the H-L transition timer 133 has been counted up, the exposure level determination unit 15 changes the exposure level to the high exposure level.

When the L-M transition timer 134 has been counted up, the exposure level determination unit 15 changes the exposure level to the medium exposure level. When the M-H transition timer 135 has been counted up, the exposure level determination unit 15 changes the exposure level to the low exposure level. When the L-H transition timer 136 has been counted up, the exposure level determination unit 15 changes the exposure level to the low exposure level.

Note that, in this embodiment, timers 13 may have been counted up at the same time. Therefore, in the present embodiment, priorities are set between timers 13 that may have been counted up at the same time.

Specifically, when the H-M transition timer 131 and the H-L transition timer 133 both have been counted up, the exposure level determination unit 15 changes the exposure level to the high exposure level. That is, in this case, the exposure level determination unit 15 gives priority to the exposure change associated with the H-L transition timer 133 has been counted up.

On the other hand, when the H-M transition timer 131 and the M-L transition timer 132 both have been counted up, the exposure level determination unit 15 changes the exposure level to the high exposure level. That is, in this case, the exposure level determination unit 15 gives priority to the exposure change associated with the M-L transition timer 132 having been counted up.

Further, when the L-M transition timer 134 and the L-H transition timer 136 both have been counted up, the exposure level determination unit 15 changes the exposure level to the low exposure level. That is, in this case, the exposure level determination unit 15 gives priority to the exposure change associated with the L-H transition timer 136 having been counted up.

On the other hand, when the L-M transition timer 134 and the M-H transition timer 135 both have been counted up, the exposure level determination unit 15 changes the exposure level to the low exposure level. That is, in this case, the exposure level determination unit 15 gives priority to the exposure change associated with the M-H transition timer 135 having been counted up.

As described above, in the present embodiment, when the external light illuminance decreases, the one associated with lower external light illuminance, that is, the one associated with higher exposure level is prioritized. Similarly, when the external light illuminance increases, the one associated with higher external light illuminance, that is, the one associated with lower exposure level is prioritized. As described above, in the present embodiment, priorities are set according to the direction in which the external light illuminance changes. The priority settings as described above are summarized in Table 2 below.

TABLE 2

| timers having been counted up simultaneously | | Priority |
| --- | --- | --- |
| M | H-L | H-L |
| H-M | M-L | M-L |
| L-M | L-H | L-H |
| L-M | M-H | M-H |

Returning to FIG. 4, an working example of the present invention, that is, an operation example according to the present embodiment will be described in comparison with a reference example.

In the configuration of the present embodiment, count-up of the H-M transition timer 131 starts at time t10 when the external light illuminance is decreasing and falls below the determination threshold T_HM. At this time t10, unlike the above-described reference example, the changing of the exposure level is held on. Then, at time t20 when the H-M transition timer 131 has been counted up, the exposure level is changed from the low exposure level to the medium exposure level. That is, unlike the above-described reference example, in the working example, the changes in the exposure level at time t20 occurs with a slight delay from the determination of the change in the illuminance level at time t10.

After time t20, count-up of the M-L transition timer 132 starts at time t11 when the external light illuminance is decreasing and falls below the determination threshold T_ML. Similarly, at this time t11, the changing of the exposure level is held on. Then, at time t21 when the M-L transition timer 132 has been counted up, the exposure level is changed from the medium exposure level to the high exposure level. That is, unlike the above-described reference example, in the working example, the changes in the exposure level at time t21 occurs with a slight delay from the determination of the change in the illuminance level at time t11.

After time t21, the external light illuminance sharply increases from time tA. At time t12 when the external light illuminance exceeds the determination threshold T_LM, count-up of the L-M transition timer 134 starts. Further, when the external light illuminance exceeds the determination threshold T_MH at time t13 immediately after t12, count-up of the M-H transition timer 135 is started. Similarly, at the time t12 and time t13, the changing of the exposure level is held on.

Then, when the L-M transition timer 134 has been counted up at time t22, the exposure level is changed from the high exposure level to the medium exposure level. Further, when the M-H transition timer 135 has been counted up at t23 immediately after t22, the exposure level is changed from the medium exposure level to the low exposure level. That is, the changes in exposure level at time t22 and time t23 occur with a slight delay from the determination of changes in illuminance level at time t12 and time t13.

After that, the own vehicle enters the tunnel at time t14. At time t14, when the external light illuminance decreases sharply and falls below both the determination thresholds T_HM and T_ML, count-up of both the H-M transition timer 131 and the H-L transition timer 133 starts. Similarly, at this time t14, the changing of the exposure level is held on.

The external light illuminance starts to increase sharply from time t14, and it exceeds the determination threshold T_LM at time t15 immediately after time t14. Then, at time t15, count-up of the L-M transition timer 134 starts. On the other hand, at time t15, count-up of the H-L transition timer 133 is stopped and its count value is reset. However, the count-up of the H-M transition timer 131 continues. Similarly, at this time t15, the changing of the exposure level is held on.

Immediately after time t15, the external light illuminance decreases sharply again and becomes lower than the determination threshold T_ML at time t16. Then, at time t16, count-up of the M-L transition timer 132 starts. On the other hand, at time t16, count-up of the L-M transition timer 134 is stopped and its count value is reset. However, the count-up of the H-M transition timer 131 continues. Similarly, at this time t16, the changing of the exposure level is held on.

After time t16, the external light illuminance starts to increase again, and sharply increases from the low illuminance corresponding to the L level. Meanwhile, at time t24 immediately after time t16, the H-M transition timer 131 has been counted up, the H-M transition timer 131 started count-up while the external light illuminance was decreasing. Then, the exposure level is changed from the low exposure level to the medium exposure level.

When the increasing external light illuminance exceeds the determination threshold T_LM at time t17 immediately after time t24, count-up of the L-M transition timer 134 is started. On the other hand, at time t17, count-up of the M-L transition timer 132 is stopped and its count value is reset. Similarly, at this time t17, the changing of the exposure level is held on.

Immediately after time t17, the external light illuminance decreases sharply again and becomes lower than the determination threshold T_ML at time t18. Then, at time t18, count-up of the M-L transition timer 132 starts. On the other hand, at time t18, count-up of the L-M transition timer 134 is stopped and its count value is reset. Similarly, at this time t18, the changing of the exposure level is held on.

After that, the own vehicle exits the tunnel and the external light illuminance increases sharply, and it exceeds both the determination thresholds T_LM and T_MH at time t19. Then, at time t19, both the L-M transition timer 134 and the L-H transition timer 136 start to count up. On the other hand, at time t19, count-up of the M-L transition timer 132 is stopped and its count value is reset. Similarly, at this time t19, the changing of the exposure level is held on.

After time t19, the external light illuminance is substantially constant. During this period, both the L-M transition timer 134 and the L-H transition timer 136 continue their count-up. Then, at time t25, both the L-M transition timer 134 and the L-H transition timer 136 have been counted up. In this case, the exposure change accompanying the L-H transition timer 136 has been counted up, is prioritized, and the exposure level is changed to the low exposure level at time t25.

While the own vehicle is traveling in the tunnel, the external light illuminance is certainly lower than the high illuminance level corresponding to daytime. Therefore, when the own vehicle enters the tunnel during the daytime, the exposure level of the vehicle-mounted camera 2 needs to be changed to an exposure level that is higher than the low exposure level corresponding to the outdoor light during the daytime.

However, simply making the exposure level follow the external light illuminance as in the prior art, or providing quantitative hysteresis as in the reference example may result in fluctuation of the exposure level in a short time. As a result, flickering may appear on the display screen of the display 4, which may be unpleasant for an occupant. On the other hand, an approach that holds the changing of the exposure level until the changes in the external light illuminance stabilize is also conceivable. However, in such an approach, the exposure level may remain fixed at a low exposure level corresponding to outside the tunnel.

In this regard, according to the working example, the exposure level is set to the medium exposure level at time t24 between time t14 and time t19 during which the own vehicle is traveling in the tunnel. In addition, the exposure level is changed only once between time t14 and time t19 during which the external light illuminance changes by a large amount and in a short time.

Therefore, according to the present embodiment, the exposure level can be reliably changed from the level corresponding to the outside of the tunnel to the level corresponding to the inside of the tunnel, and at the same time, changes of the exposure level in a short time can be suitably suppressed. As a result, the visibility of the display 4 can be favorably maintained, and occurrence of flickering on the display screen can also be suitably suppressed.

As described above, in the configuration of the present embodiment, timers 13 corresponding to respective change modes between a plurality of illuminance levels or between a plurality of exposure levels are operated in accordance with the state of change of the illuminance level. The exposure level of the vehicle-mounted camera 2 is determined based on the count state of each timer 13. As a result, an appropriate temporal hysteresis is provided between the change in the illuminance level and the change in the exposure level of the vehicle-mounted camera 2. Therefore, according to such a configuration, it is possible to further optimize the exposure control of the vehicle-mounted camera 2.

<Modifications>

The present disclosure is not limited to the above embodiment. Therefore, the above embodiment can be modified as appropriate. Typical modified examples will be described below. In the following description of the modified examples, only the parts different from the above embodiment will be described. Further, the same or equivalent parts of the above-described embodiment and the modified examples are designated by the same reference symbols. Therefore, in the following description of the modified examples, regarding the components having the same reference signs as those of the above embodiment, the description given in connection with the above embodiment can be applied as appropriate unless there is technical contradiction or particular additional mention.

The present disclosure is not limited to the specific device configuration described with regard to the above embodiment. For example, the on-vehicle monitor device 1 is not limited to a so-called electronic mirror device. That is, for example, the on-vehicle monitor device 1 may be a so-called rear view monitor device or back view monitor device that displays the rear view of the own vehicle. Alternatively, for example, the on-vehicle monitor device 1 may be a so-called nose view monitor device or a front blind monitor device that displays a lateral view of the front corner parts of the own vehicle. Alternatively, for example, the on-vehicle monitor device 1 may be a so-called around view monitor device that displays a bird's-eye image of the surroundings of the own vehicle.

The external light illuminance may be detected based on the output of an image sensor or the like built in the vehicle-mounted camera 2. Therefore, it is not necessary to provide the illuminance sensor 3 separately from the vehicle-mounted camera 2. That is, the illuminance sensor 3 may be omitted.

The application target of the exposure control unit 10 is not limited to the on-vehicle monitor device 1. That is, for example, the exposure control unit 10 can also be applied to automated driving control or automated parking control.

The present disclosure is not limited to the specific overview of operations or examples of operations described with regard to the above embodiment. That is, for example, the quantitative hysteresis of the illuminance level determination shown in FIG. 3 is not limited to the specific values of the determination thresholds shown in FIG. 3. That is, the specific determination thresholds shown in FIG. 3 are merely specific examples used for convenience of description of the embodiment, and they may be changed as appropriate.

It can be either said that each timer 13 corresponds to the mode the illuminance level changes, or corresponds to the mode the exposure level of the vehicle-mounted camera 2 is changed. Specifically, for example, it can be either said that the H-M transition timer 131 corresponds to the change mode of exposure level from the low exposure level to the medium exposure level, or corresponds to the change mode of illuminance level from the H level to the M level. The same applies to the M-L transition timer 132 and other timers.

In the above-described embodiment, the illuminance level determination unit 11 is configured to determine the external light illuminance in three tiers. The exposure level determination unit 15 is also configured to set the exposure level in three tiers. However, the present disclosure is not limited to such mode. That is, the determination of the external light illuminance and the setting of the exposure level may be performed with two tiers or four or more tiers.

It goes without saying that the components of the above-described embodiment are not necessarily essential unless expressly stated otherwise or it is considered to be obviously essential in principle, etc. In addition, when a numerical value such as the number, value, amount, or range of a component(s) is mentioned, the present disclosure is not limited to the particular number unless expressly stated otherwise or it is obviously limited to the particular number in principle, etc. Similarly, when the shape, direction, positional relationship, or the like of a component or the like is mentioned, the present disclosure is not limited to the shape, direction, positional relationship, or the like unless explicitly stated otherwise or it is limited to the specific shape, direction, positional relationship, or the like in principle, etc.

Modified examples are not limited to the above examples. A plurality of modified examples can be combined with each other. Further, all or a part of the above-described embodiment may be combined with all or a part of the modified examples.

Each of the above-described functional configurations and methods may be realized by a dedicated computer provided by configuring a processor and a memory programmed to execute one or more functions embodied by computer programs. Alternatively, each of the functional configurations and methods described above may be realized by a dedicated computer provided by configuring a processor with one or more dedicated hardware logic circuits. Alternatively, each of the functional configurations and methods described above may be realized by one or more dedicated computers configured by combining a processor and a memory programmed to execute one or more functions with a processor configured by one or more hardware logic circuits. Further, the computer program may be stored in a computer-readable non-transitory tangible storage medium as instructions executed by the computer.

What is claimed is:

1. An exposure control device comprising:
   an illumination level determination unit configured to determine that an illumination level of an external light illuminance corresponds to one of a plurality of illuminance levels;
   a plurality of timers each provided for a corresponding one of a plurality of change modes, the change modes being defined among the plurality of illuminance levels, or among a plurality of exposure levels for an exposure of a vehicular camera;
   a timer operating unit configured to operate each of the plurality of timers in accordance with a state of change of the illuminance level of the external light illuminance; and
   an exposure level determination unit configured to determine one of the exposure levels for the exposure of the vehicular camera based on a count state of each of the plurality of timers.

2. The exposure control device according to claim 1, wherein
   the plurality of timers include a first timer, a second timer, and a third timer;
   the plurality of illuminance levels include a first illuminance level, a second illuminance level, and a third illuminance level;
   the exposure levels include a first exposure level, a second exposure level, and a third exposure level; and
   the timer operating unit is configured to
      count up the first timer and resets the second timer when the illuminance level of the external light illuminance changes from the first illuminance level to the second illuminance level between the first illuminance level and the third illuminance level,
      count up the second timer and resets the first timer when the illuminance level of the external light illuminance changes from the second illuminance level to the first illuminance level, and
      count up the first timer and the third timer and resets the second timer when the illuminance level of the external light illuminance changes from the first illuminance level to the third illuminance level; and
   the exposure level determination unit is configured to
      change the exposure for the exposure of the vehicular camera to the second exposure level between the first exposure level and the third exposure level when the first timer has been counted up,
      change the exposure for the exposure of the vehicular camera to the first exposure level when the second timer has been counted up, and
      change the exposure for the exposure of the vehicular camera to the third exposure level when the third timer has been counted up.

3. The exposure control device according to claim 2, wherein the exposure level determination unit changes the exposure of the vehicular camera to the third exposure level when both the first timer and the third timer have been counted up.

4. The exposure control device according to claim 2, wherein
   the plurality of timers further include a fourth timer and a fifth timer; and
   the timer operating unit is configured to
      count up the fourth timer and resets the fifth timer when the illuminance level of the external light illuminance changes from the second illuminance level to the third illuminance level, and
      count up the fifth timer and resets the fourth timer when the illuminance level of the external light illuminance changes from the third illuminance level to the second illuminance level; and
   the exposure level determination unit is configured to
      change the exposure of the vehicular camera to the third exposure level when the fourth timer has been counted up, and
      change the exposure of the vehicular camera to the second exposure level when the fifth timer has been counted up.

5. The exposure control device according to claim 4, wherein
   the plurality of timers further include a sixth timer; and
   the timer operating unit counts up the sixth timer and resets the third timer when the illuminance level of the external light illuminance changes from the third illuminance level to the first illuminance level, and
   the exposure level determination unit changes the exposure of the vehicular camera to the first exposure level when the sixth timer has been counted up.

6. The exposure control device according to claim 5, wherein
   the timer operating unit is configured to
      count up the first timer and resets the second timer and the sixth timer when the illuminance level of the external light illuminance changes from the first illuminance level to the second illuminance level,
      count up the fourth timer and resets the fifth timer when the illuminance level of the external light illuminance changes from the second illuminance level to the third illuminance level,
      count up the first timer and the third timer, and resets the second timer, the fifth timer, and the sixth timer, when the illuminance level of the external light illuminance changes from the first illuminance level to the third illuminance level,
      count up the fifth timer and resets the third timer and the fourth timer when the illuminance level of the external light illuminance changes from the third illuminance level to the second illuminance level,
      count up the second timer and resets the first timer when the illuminance level of the external light illuminance changes from the second illuminance level to the first illuminance level, and
      count up the fifth timer and the sixth timer, and resets the first timer, the third timer, and the fourth timer, when the illuminance level of the external light illuminance changes from the third illuminance level to the first illuminance level.

7. The exposure control device according to claim 5, wherein the exposure level determination unit changes the exposure of the vehicular camera to the first exposure level when both the fifth timer and the sixth timer have been counted up.

8. The exposure control device according to claim 4, wherein the exposure level determination unit changes the exposure of the vehicular camera to the third exposure level when both the first timer and the fourth timer have been counted up.

9. The exposure control device according to claim 4, wherein the exposure level determination unit changes the exposure of the vehicular camera to the first exposure level when both the second timer and the fifth timer have been counted up.

10. The exposure control device according to claim 1, wherein the illumination level determination unit is configured to:
   determine whether the illumination level of the external light illuminance has decreased using a first luminance-level determination threshold; and
   determine whether the illumination level of the external light illuminance has increased using a second determination threshold, the second luminance-level determination threshold, the second luminance-level determination threshold being set to be higher than the first luminance-level determination threshold.

11. An exposure control method of a vehicle-mounted camera, comprising:
   determining that an illumination level of an external light illuminance corresponds to one of a plurality of illuminance levels;
   operating each of a plurality of timers, each provided for a corresponding one of a plurality of change modes, the change modes being defined among the plurality of illuminance levels, or among a plurality of exposure levels for an exposure of a vehicular camera; and
   determining one of the exposure levels for the exposure of the vehicular camera based on a count state of each of the plurality of timers.

12. The exposure control method according to claim 11, wherein
   the plurality of timers include a first timer, a second timer, and a third timer;
   the plurality of illuminance levels include a first illuminance level, a second illuminance level, and a third illuminance level;
   the exposure levels include a first exposure level, a second exposure level, and a third exposure level; and
   operating of the plurality of timers includes:
      counting up the first timer and resetting the second timer when the illuminance level of the external light illuminance changes from the first illuminance level to the second illuminance level between the first illuminance level and the third illuminance level,
      counting up the second timer and resetting the first timer when the illuminance level of the external light illuminance changes from the second illuminance level to the first illuminance level, and
      counting up the first timer and the third timer and resetting the second timer when the illuminance level of the external light illuminance changes from the first illuminance level to the third illuminance level; and
   determining the one of the exposure levels includes:
      changing the exposure for the exposure of the vehicular camera to the second exposure level between the first exposure level and the third exposure level when the first timer has been counted up,
      changing the exposure for the exposure of the vehicular camera to the first exposure level when the second timer has been counted up, and
      changing the exposure for the exposure of the vehicular camera to the third exposure level when the third timer has been counted up.

13. The exposure control method according to claim 12, wherein, determining the one of the exposure levels includes changing the exposure of the vehicular camera to the third exposure level when both the first timer and the third timer have been counted up.

14. The exposure control method according to claim 12, wherein
   the plurality of timers further include a fourth timer and a fifth timer; and
   operating of the plurality of timers includes:
      counting up the fourth timer and resetting the fifth timer when the illuminance level of the external light illuminance changes from the second illuminance level to the third illuminance level, and
      counting up the fifth timer and resetting the fourth timer when the illuminance level of the external light illuminance changes from the third illuminance level to the second illuminance level, and
   determining of the one of the exposure levels includes:
      changing the exposure of the vehicular camera to the third exposure level when the fourth timer has been counted up, and
      changing the exposure of the vehicular camera to the second exposure level when the fifth timer has been counted up.

15. The exposure control method according to claim 14, wherein,
   the plurality of timers further include a sixth timer; and
   operating of the plurality of timers includes counting up the sixth timer and resetting the third timer when the illuminance level of the external light illuminance changes from the third illuminance level to the first illuminance level, and
   determining of the one of the exposure levels includes changing the exposure of the vehicular camera to the first exposure level when the sixth timer has been counted up.

16. The exposure control method according to claim 15, wherein,
   operating of the plurality of timers includes:
      counting up the first timer and resetting the second timer and the sixth timer when the illuminance level of the external light illuminance changes from the first illuminance level to the second illuminance level,
      counting up the fourth timer and resetting the fifth timer when the illuminance level of the external light illuminance changes from the second illuminance level to the third illuminance level,
      counting up the first timer and the third timer and resetting the second timer, the fifth timer, and the sixth timer, when the illuminance level of the external light illuminance changes from the first illuminance level to the third illuminance level,
      counting up the fifth timer and resetting the third timer and the fourth timer when the illuminance level of the external light illuminance changes from the third illuminance level to the second illuminance level,
      counting up the second timer and resetting the first timer when the illuminance level of the external light illuminance changes from the second illuminance level to the first illuminance level, and
   counting up the fifth timer and the sixth timer and resetting the first timer, the third timer, and the fourth timer, when the illuminance level of the external light illuminance changes from the third illuminance level to the first illuminance level.

17. The exposure control method according to claim 15, wherein, determining of the one of the exposure levels includes changing the exposure of the vehicular camera to the first exposure level when both the fifth timer and the sixth timer have been counted up.

18. The exposure control method according to claim 14, wherein, determining of the one of the exposure levels includes changing the exposure of the vehicular camera to the third exposure level when both the first timer and the fourth timer have been counted up.

19. The exposure control method according to claim 14, wherein, determining of the one of the exposure levels includes changing the exposure of the vehicular camera to the first exposure level when both the second timer and the fifth timer have been counted up.

20. The exposure control method according to claim 11, wherein, further comprising:
 determining whether the illumination level of the external light illuminance has decreased using a first luminance-level determination threshold; and
 determining whether the illumination level of the external light illuminance has increased using a second luminance-level determination threshold, the second luminance-level determination threshold being set to be higher than the first luminance-level determination threshold.

* * * * *